United States Patent
Kühl

(10) Patent No.: US 12,168,263 B2
(45) Date of Patent: Dec. 17, 2024

(54) DYNAMIC BEAM DEFLECTION AND SHAPING FOR HIGH-POWER LASER MACHINING PROCESS

(71) Applicant: II-VI Delaware, Inc, Wilmington, DE (US)

(72) Inventor: Patrick Kühl, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 515 days.

(21) Appl. No.: 17/443,070

(22) Filed: Jul. 20, 2021

(65) Prior Publication Data

US 2023/0022699 A1 Jan. 26, 2023

(51) Int. Cl.
*B23K 26/082* (2014.01)
*B23K 26/06* (2014.01)
(Continued)

(52) U.S. Cl.
CPC ........ *B23K 26/082* (2015.10); *B23K 26/0665* (2013.01); *B23K 26/703* (2015.10);
(Continued)

(58) Field of Classification Search
CPC .............. B23K 26/082; B23K 26/0665; B23K 26/703; B23K 26/705; B23K 26/707; B23K 26/0608; B23K 26/342; B23K 26/0006; B23K 26/032; B23K 26/0676; B23K 26/034; B23K 26/044; B23K 26/0876; B23K 2101/40; B23K 2103/50; B23K 26/0604; B23K 26/0613; B23K 26/0622; B23K 26/0626; B23K 26/064;
(Continued)

(56) References Cited

U.S. PATENT DOCUMENTS 6,738,539 B2 * 5/2004 Hagood ............... G02B 6/3578
385/24
7,400,799 B2 * 7/2008 Koishi ................... G02B 6/262
385/33
(Continued)

FOREIGN PATENT DOCUMENTS

CN 112518145 * 3/2021

OTHER PUBLICATIONS

Rouse, Margaret, Single-Mode Fiber, Nov. 3, 2014, Technopedia, Highlighted region. (Year: 2014).*

*Primary Examiner* — Chris Q Liu
(74) *Attorney, Agent, or Firm* — Blank Rome LLP

(57) ABSTRACT

A laser processing head for a laser beam uses actuators engaged with a delivery fiber end to deflect the fiber end relative to an optical axis. The laser beam from the fiber end is collimated by a collimator and is then focused by a focusing component disposed in the head beyond the collimator to a focal point. The focal point of the laser beam is deflected from the optical axis in relation to the deflection of the fiber end. The fiber end and the actuators are housed in a sealed module. Deflection of the laser beam can be sensed by reflecting portion of the laser beam to a sensing element so a control system can monitor and control the fiber end's movement. A mode-stripper in the sealed module removes (Continued)

light from cladding of the delivery fiber, and an actively cooled absorber in the module around the fiber absorbs the energy.

19 Claims, 5 Drawing Sheets

(51) Int. Cl.
*B23K 26/70* (2014.01)
*G02B 6/26* (2006.01)
(52) U.S. Cl.
CPC .......... *B23K 26/705* (2015.10); *B23K 26/707* (2015.10); *G02B 6/262* (2013.01)
(58) Field of Classification Search
CPC ............ B23K 26/0643; B23K 26/0648; B23K 26/0652; B23K 26/067; B23K 26/0861; B23K 26/0884; B23K 26/14; B23K 26/142; B23K 26/1437; B23K 26/1462; B23K 26/382; B23K 26/389; B23K 26/40; B23K 26/702; B23K 37/003; G02B 6/262; G02B 6/32; G02B 6/4296
USPC ......................................... 219/121.69, 121.85
See application file for complete search history.

(56) References Cited

U.S. PATENT DOCUMENTS

| | | | |
|---|---|---|---|
| 8,503,837 B2 | 8/2013 | Beresnev et al. | |
| 10,551,574 B2* | 2/2020 | Alkeskjold | ........ G02B 6/02328 |
| 10,589,377 B2 | 3/2020 | Vorontsov | |
| 10,630,043 B1 | 4/2020 | Vorontsov et al. | |
| 10,673,531 B2* | 6/2020 | Allouche | ................ H04B 10/40 |
| 10,677,994 B2* | 6/2020 | Frisken | ................ G02B 6/3512 |
| 10,727,643 B1* | 7/2020 | Williams | .............. H01S 3/1001 |
| 2006/0255023 A1* | 11/2006 | Jurgensen | ................ B41C 1/05 |
| | | | 219/121.69 |
| 2012/0224824 A1 | 9/2012 | Beresnev et al. | |
| 2013/0215527 A1 | 8/2013 | Beresnev et al. | |
| 2018/0045895 A1* | 2/2018 | Lee | .......................... G02B 6/14 |
| 2019/0009358 A1 | 1/2019 | Vorontsov | |
| 2019/0009369 A1* | 1/2019 | Vorontsov | .......... G02B 6/02052 |
| 2019/0047089 A1* | 2/2019 | Riemann | ................ B22F 10/22 |
| 2019/0372297 A1* | 12/2019 | Jakubowicz | .......... H01S 3/0619 |
| 2020/0180066 A1 | 6/2020 | Vorontsov | |
| 2020/0220642 A1* | 7/2020 | DeAndrea | ........... H04J 14/0278 |
| 2020/0306880 A1 | 10/2020 | Vorontsov et al. | |
| 2020/0366048 A1 | 11/2020 | Vorontsov et al. | |
| 2021/0096308 A1* | 4/2021 | Fuchs | .................. G02B 6/4227 |
| 2021/0162544 A1* | 6/2021 | Fujii | .................... B23K 26/064 |

* cited by examiner

DYNAMIC BEAM DEFLECTION AND SHAPING FOR HIGH-POWER LASER MACHINING PROCESS

BACKGROUND OF THE DISCLOSURE

Many laser machining processes require beam deflection in the X-Y direction perpendicular to the beam propagation direction (Z-axis). The beam deflection can be used for a number of purposes in laser cutting, welding, soldering, surface treatment, brazing, additive manufacturing, and other processes. In a laser additive manufacturing (LAM) system, for example, a sharply focused projected laser beam is used to create a highly localized (point) heat source that is rapidly rastered (scanned) to achieve selective laser melting (SLM) of a stock material.

In laser machining processes, a number of approaches are used for deflecting a high-power laser beam perpendicular to the direction of propagation. These approaches use scanning optics that include: X-Y adjustments of the lenses, a galvanometer scanner, tip-tilt mirrors, and rotating prisms. In these approaches, the scanning optics require extra opto-mechanical elements in the high-power system to provide the desired beam deflection. The extra opto-mechanical elements take up more space in the assembly and increases overall costs.

In the end, every implementation that uses beam deflection is typically designed with its own adjustment solution because there is no solution that can be used across several implementations. Above all, current systems are severely limited when considering the maximum dynamics that can be achieved. Finally, although methods may exist for steering a short length of a thin optical fiber in optical telecommunication systems, high-power laser machining processes have particular challenges that those methods cannot address.

The subject matter of the present disclosure is directed to overcoming, or at least reducing the effects of, one or more of the problems set forth above.

SUMMARY OF THE DISCLOSURE

A laser processing head for a laser beam disclosed herein comprise a module disposed in the head and having an input and an output. A delivery fiber is disposed in the input of the module and is configured to emit the laser beam from a fiber end toward the output of the module. At least one actuator disposed in the module is engaged with the fiber end. The at least one actuator is configured to deflect the fiber end on at least one side axis relative to an optical axis. A collimator disposed in the head on the optical axis collimates the laser beam emitted from the fiber end beyond the output of the module, and a focusing component disposed in the head on the optical axis focuses the laser beam from the collimator to a focal point, which is deflected from the optical axis in relation to the deflection of the fiber end.

A module for a laser processing head that provides a laser beam as disclosed herein comprises a sealed housing having an input, an interior, and an output. The output has a window enclosing the interior. The sealed housing is configured to integrate into the laser processing head. A delivery fiber sealed in the input of the sealed housing is configured to emit the laser beam from a fiber end toward the output; and at least one actuator disposed in the sealed housing is engaged with the fiber end. The at least one actuator is configured to deflect the fiber end on at least one side axis relative to an optical axis.

A laser processing method disclosed herein comprises: emitting a laser beam from a fiber end of an optical fiber disposed in an input of a sealed module; deflecting the fiber end on at least one side axis relative to an optical axis by actuating at least one actuator engaged with the fiber end in the sealed module; collimating the laser beam emitted from the fiber end with a collimator beyond an output of the sealed module; and focusing the laser beam from the collimator to a focal point using a focusing component, the focal point being deflected from the optical axis in relation to the deflection of the fiber end.

The foregoing summary is not intended to summarize each potential embodiment or every aspect of the present disclosure.

DETAILED DESCRIPTION OF THE DISCLOSURE

Figures 1A, 1B:
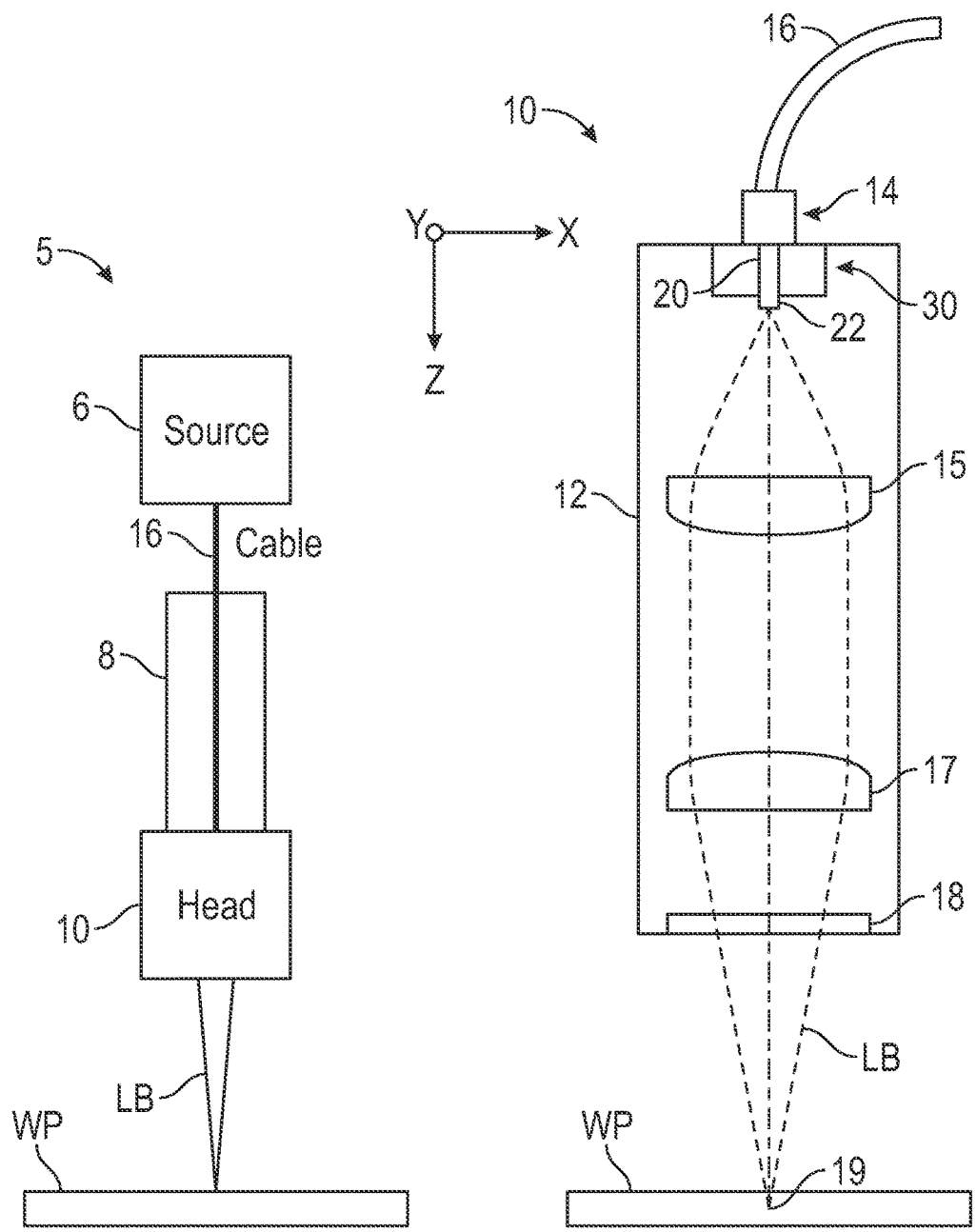
FIG. 1A illustrates a laser delivery system according to the present disclosure.
FIG. 1B schematically illustrates a laser processing head according to the present disclosure.

FIG. 1A illustrates a laser delivery system 5 according to the present disclosure. A laser source 6 generates laser light that is propagated along a fiber optic cable 16 to a laser processing head 10. The laser source 6 can be a multi-mode or a single-mode laser depending on the laser power and density required.

The laser processing head 10 can be moved relative to a workpiece WP and/or can have the workpiece WP moved relative to it. For example, the laser processing head 10 can be moved by a gantry system, robotic arm, or other apparatus 8 used in the art. Internally, the laser processing head 10 includes optics to focus the laser energy in a laser beam LB to the workpiece WP to achieve cutting, brazing, welding, additive manufacturing, or some other lasing process.

FIG. 1B schematically illustrates a laser processing head 10 according to the present disclosure. The laser processing head 10 includes a housing 12 for internal optics. A receiver 14 at one end of the housing 12 can couple to a laser cable 16, which conducts the laser light into the head 12. An output 18 at the other end of the housing 12 allows a focused laser beam LB to be emitted from the housing 12 for achieving the purposes of the lasing operation, such as welding, additive manufacture, cutting, etc. To protect the internal optics inside the housing 12, the output 18 can include a cover slide that acts as a transparent pressure window.

During operation, a high power laser delivery fiber 20 emits a high power laser beam LB in the housing 12. (As understood herein, the delivery fiber 20 can include one or more fiber elements—i.e., one or more optical fibers or the like) A collimator 15 collimates the laser beam LB, and a focusing component 17 focuses the laser beam LB, which passes through the protective cover slide of the output 18. (As will be appreciated, the collimator 15 and the focusing component 17 are only schematically shown here. Depending on the implementation, the collimator 15 can include one or more lenses and other optical elements as a unit, and the focusing component 17 can likewise include one or more lenses and other optical elements as a unit.) The beam LB is focused to a focal point that is then imaged at a process area (e.g., impinges on the workpiece WP).

The laser processing head 10 is used in a laser machining process in which the laser beam LB is deflected in the X-Y direction perpendicular to the beam propagation direction (Z-axis). As will be appreciated, the beam deflection can be used for laser cutting, welding, soldering, surface treatment, brazing, additive manufacturing processes, and the like. In laser additive manufacturing (LAM), for example, the sharply focused projected laser beam LB is used create a highly localized heat source at the focal point 19 that is rapidly rastered (scanned) to achieve selective laser melting (SLM) of a stock material.

In contrast to the prior art techniques of using scanning optics, such as X-Y adjustments of lenses, a galvanometer scanner, tip-tilt mirrors, and rotating prisms, the beam deflection of the present disclosure is preferably set up in an automated process that improves process stability, bridges gaps, offers broader seam cross-sections, cuts with higher quality and less laser power, increases absorption and thus efficiency, and can be decoupled from camera or process monitoring in the head 10.

According to the present disclosure, a beam deflection system 30 in the head 10 deflects the laser beam LB emitted from the housing 12 by deflecting the end 22 of the delivery fiber 20. This beam deflection system 30 can be used more universally across different implementations, from static adjustment to high dynamic beam shaping. The beam deflection system 30 is integrated into the laser processing head 10 and can be cost-efficient compared to other configurations used for beam deflection.

For example, the laser light cable 16 is a high-power fiber optic cable used in laser material processing systems. The laser light cable 16 guides the light to the laser processing head 10 preferably with almost no power or beam quality loss. For dynamic applications, the light cable 16 is robust to withstand the high accelerations, process speeds, and precision needed.

Depending on the optical characteristics for the implementation at hand, for example, the light cable 16 can have a core diameter from 30-μm to 2000-μm. As will be appreciated, the delivery fiber 20 can include any fiber similar to those used according to the state of the art for the transmission of laser light in a high-power system. In general, the delivery fiber 20 can include one or more optical fibers, a fiber bundle, etc. The delivery fiber 20 can include a step index fiber or a gradient index fiber. The delivery fiber 20 can include a fiber with several claddings, such as the type of fiber used for beam shaping of ring modes. High-performance Anti-Reflection coatings designed for high beam intensities can be used and can reduce Fresnel losses at the fiber tip to a minimum. Specific optical materials and splice technologies known in the art can also be used to maintain the best beam quality and high transmission of the laser light from the cable 16 to the delivery fiber 20.

If needed, a fiber-to-fiber coupler (not shown) can be used to connect two laser light cables 16 together. At the laser processing head 10, the laser light cable receiver 14 offers precise placement of a laser light cable connector. The receiver 14 can stabilize the positioning of the delivery fiber 20 and its fiber tip 22 in highly dynamic applications.

The system 30 is able to move at least a portion of the delivery fiber 20 from the fiber receiver 14 relative to the collimator 15. In particular, a number of discrete actuators (not shown) having motors or drives are used to move the fiber end 22 of the delivery fiber 20. For example, the actuators can use drives that directly drive solid-state joints, mechanical bearings, or the like that are engaged with the delivery fiber 20.

In this embodiment, the delivery fiber 20 and the laser processing head 10 are integrated together, and the beam deflection system 30 operates independent of process monitoring or other adjustment mechanisms inside the laser processing head 10. The arrangement is suitable for very high laser power (>10 kW) and a variety of processes. The arrangement can also be combined with high dynamic multi-deflectable fiber arrays.

Figure 2A:
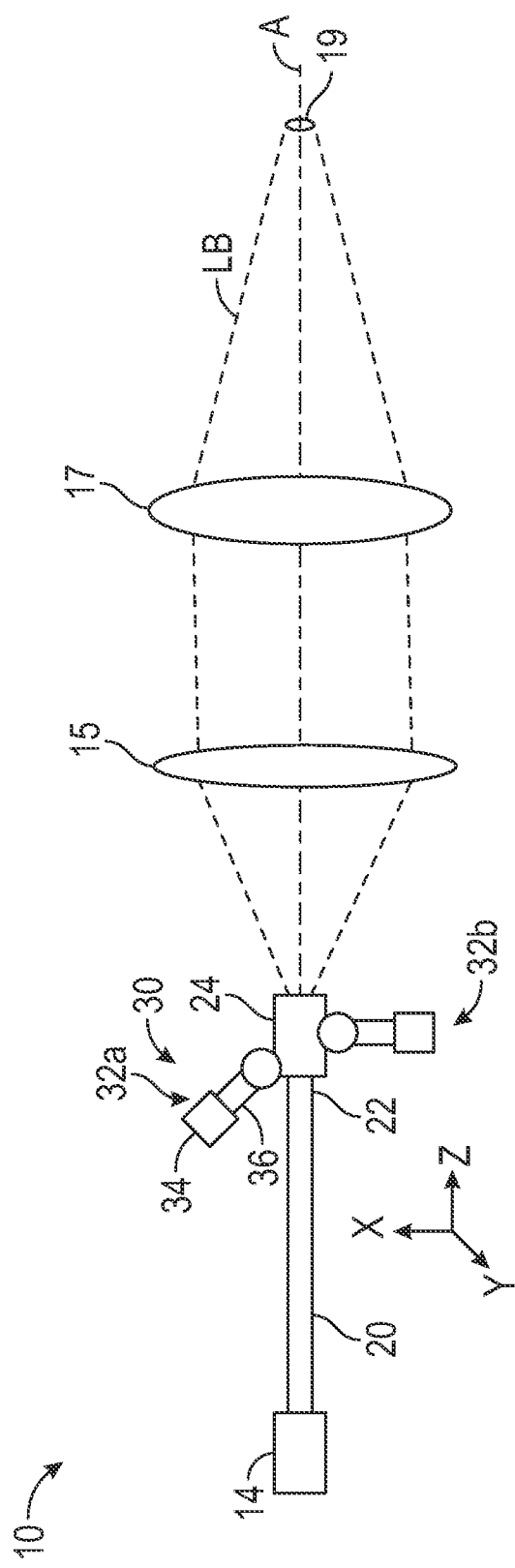
FIGS. 2A-2B schematically illustrate some of the mechanical components of the disclosed processing head during deflection of a delivery fiber.
Figure 2B:
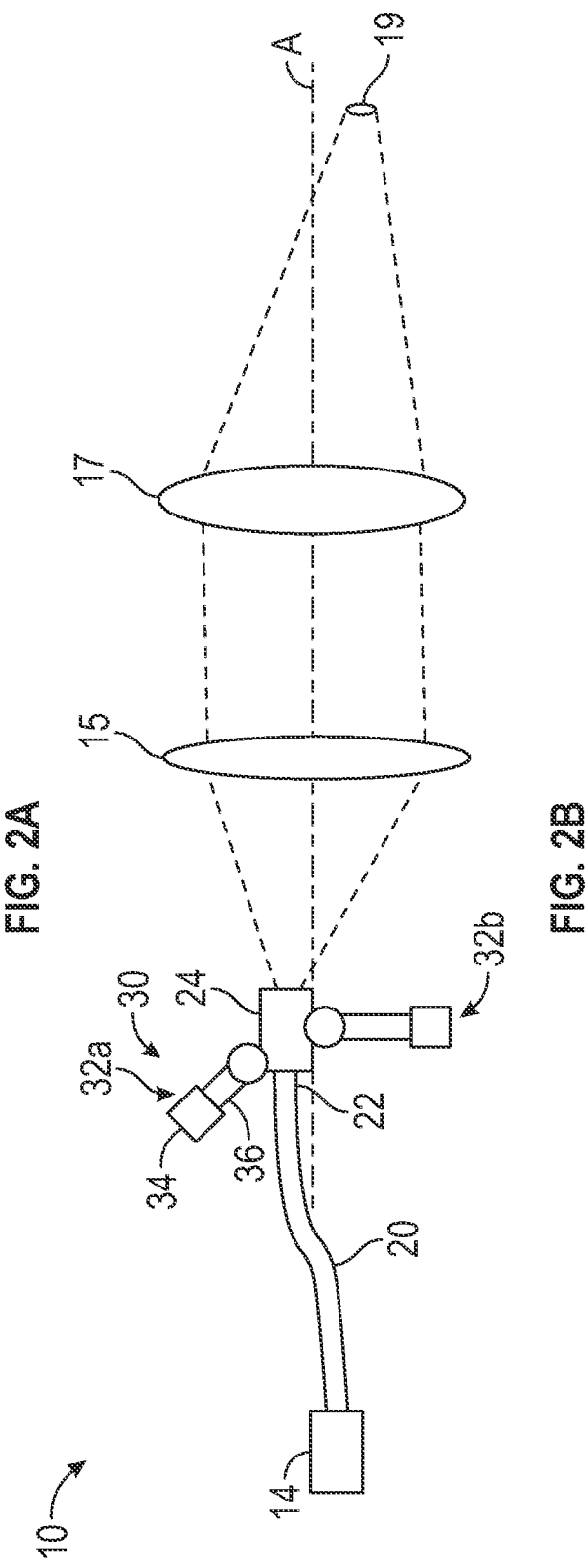

FIGS. 2A-2B schematically illustrate some of the mechanical components of the disclosed processing head 10 during deflection of the fiber end 22 of the delivery fiber 20 in the head 10. As shown, at least two actuators 32*a-b* use drives 34 that directly drive solid-state joints 36, mechanical bearings, or the like that are engaged with the delivery fiber 20. Under the control to the actuators 32*a-b*, the beam deflection takes place through the X-Y deflection and/or tilting of the fiber tip 22 of the laser delivery fiber 20 in front of the collimator 15. As shown, the fiber tip 22 can include an end cap, a quartz block 24, or the like spliced onto the fiber end 22. The quartz block 24 can be a fused silica end cap melded to the fiber end 22 and can facilitate the coupling of the actuators 32*a-b* to the fiber end 22 for manipulation. The change in the beam's exit position and/or the direction of the beam's propagation relative to the optical axis A of the laser processing head 10 leads to a shift in the focus position 19 in the process zone. The end surface of the quartz block 24 can also be configured in the form of a lens surface in order to influence the shape and divergence of the laser beam emerging from the block 24. For example, an output side of the quartz block 24 can have a spherical surface or an aspherical surface. Moreover, the output side of the quartz block 24 can have an antireflective coating.

In this embodiment, the delivery fiber 20 can be integrated into or can extend from the receiver 14 of the head 10. The laser beam LB is deflected by moving and/or tilting the fiber end 22 (or the quartz block 24 spliced thereon). Using this configuration, the deflection system 30 makes optical translations that offer short adjustment paths, and high dynamic beam deflection can be achieved.

Additionally, the integration of the beam deflection of the laser delivery fiber 20 in the laser processing head 10 makes for a lower mass assembly, which can improve the dynamics of the device. For example, one or more of the fiber receiver 14, the laser delivery fiber 20, the actuators 32*a-b*, the collimator 15, and other components can be integrated together in the laser processing head 10, which can allow the assembly to be easily integrated and controlled in various implementations. The arrangement is suitable for high laser power and can be combined to create highly dynamic, multi-deflectable fiber arrays.

Figure 3:
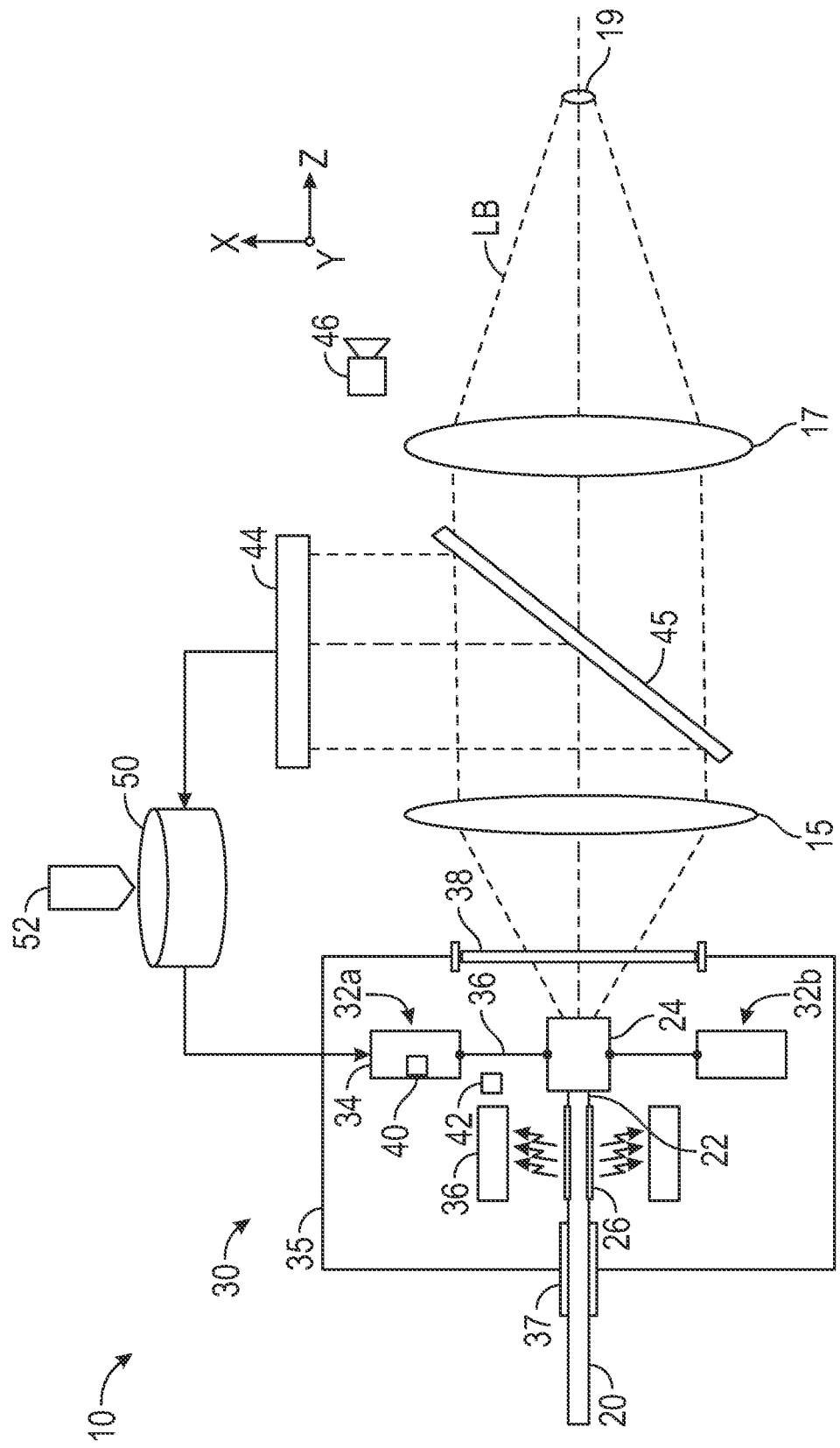
FIG. 3 schematically illustrates additional monitoring and control features of the laser processing head of the present disclosure.

Moreover, as discussed later, the deflection system 30 can have the form of a beam deflection unit or module (35: FIG. 3) and can be integrated directly into a fiber connector as an integrated module. This integrated module (35) can then be easily attached to (or removed from) other components of the processing head 10, such as a collimation unit having the collimator 15 and other components. The integrated module

(35) can make integration of the deflection system 30 into larger laser systems or machines easier. Additionally, such an integrated module (35) can be used to easily retrofit existing systems.

FIGS. 2A-2B show the delivery fiber 20 being manipulated by the beam deflection system 30 to change the focal point 19 of the laser beam LB. As schematically shown, the beam deflection system 30 can include at least two actuators 32a-b situated for manipulating the fiber end 22 of the delivery fiber 20 in an X-Y plane. Each of the actuators 32a-b can be operable to move the fiber end 22 along at least one axis of the X-Y plane. The fiber end 22 being oscillated can have mechanical supports to avoid fatal damages due to resonances.

FIG. 2A shows the neutral position with the fiber end 22 aligned with the longitudinal optical axis A between the collimator 15 and the focusing component 17 so that the focal point 19 lies along the optical axis A. Optical energy of the laser beam from the quartz block 24 (or fiber tip) passes to the collimator 15. The collimator 15 collimates the laser beam LB and images the beam LB to the focusing component 17, which then focuses the beam to a focus position 19.

FIG. 2B shows a deflected position with the fiber end 22 shifted relative to the longitudinal optical axis A between the collimator 15 and the focusing component 17. The focal point 19 in turn is shifted from the optical axis A. As shown in FIG. 2B, deflection of the fiber end 22 changes the beam exit point relative to the collimator 15, which moves the focal point 19 in the opposite direction. Repeated and controlled deflection of the fiber end 22 thereby achieves corresponding movement of the focal point 19, which can be used in the lasing process of the workpiece.

The ratio of the deflection ($x_{fiber\ tip}$) of the fiber tip 22 of the beam exit point relative to the focus position movement ($x_{focus\ position}$) is determined by the imaging scale or magnification (M) of the laser processing head 10. The magnification (M) represents the ratio between the focal lengths of the collimator ($f_{collimation\ lens}$) and the focusing lens ($f_{focus\ lens}$).

The following formula shows the relationship for the lateral movements. For simplicity, movement is only shown for the X-direction.

$$x_{focus\ position} = M \cdot x_{fiber\ tip} = \frac{f_{focus\ lens}}{f_{collimation\ lens}} \cdot x_{fiber\ tip}$$

(Deflection in the Y-direction would be similarly configured.) As can be seen from the formula, the magnification M corresponds to an "optical transmission ratio", e.g.:

for M=3, the movement on the fiber side is amplified by a factor of 3 towards the focus position, or for M=1 there is a one to one translation.

For completeness, the movement along the optical axes A corresponds to the square of the magnification multiplied by the movement of the fiber tip 22 in the Z-direction.

$$z_{focus\ position} = M^2 \cdot z_{fiber\ tip}$$

The actuators 32a-b use drives 34 to produce the deflection-one drive for the X-axis and another drive for the Y-axis. Various types of drives 34 can be used for the needed deflection. For example, the drive 34 can use a piezoelectric device, a solenoid, or an electromagnetic actuator. The drive 34 connects by joints/bearings 36 that engage the fiber end 22 (or the spliced block 24) as the case may be). These joints/bearings 36 are preferably solid joints or flexure bearings. These solid joints/flexure bearings 36 are preferably made from one single piece of material, offering high rigidity, resilience, and freedom from wear. The joints/bearings 36 can be made from non-magnetic materials, which does not require any lubricants as is ideal for laser applications with high laser power. The joints/bearings 36 and any holders of the fiber tip 22 or quartz block 24 are preferably, but not necessarily, designed so that they allow independent movement of the axes.

The beam deflection system 30 can be controlled without sensors. Alternatively, as disclosed below with reference to FIGS. 3 and 5, the beam deflection system 30 can be operated in a control loop using position feedback sensing.

FIG. 3 schematically illustrates the laser processing head 10 having additional monitoring and control features of the present disclosure. The beam deflection system 30 includes a module 35 in the form of a protective housing disposed in the head 10. The module 35 with its protective housing has an interior and has an input 37 and an output 38. The delivery fiber 20 is disposed in the input 37, and the delivery fiber 20 is configured to emit the laser beam from the fiber end 22 and out of the output 38 of the module 35.

The input 37 can include a passage of the module 35 sealed with the delivery fiber 20. Meanwhile, the output 38 includes a protective window of the module 35. The protective housing of the module 35 protects the components of the beam deflection system 30 from adverse effects, such as temperatures, vibrations, back-reflection, contamination and the like as discussed below.

In general, at least one actuator 32a-b is disposed in the module 35 and is engaged with the fiber end 22 (or the block 24). As noted herein, the at least one actuator 32a-b is configured to deflect the fiber end on at least one side X, Y axis relative to an optical axis (i.e., axis A along Z-direction). To keep the mass low, the actuators 32a-b can move the naked fiber tip 22, but this may practically limit the power output. Instead as noted, the fiber end 22 can include the quartz block 24 spliced to the fiber tip 22 of the delivery fiber 20.

As noted, the collimator 15 is disposed in the head 10 on the optical axis A and collimates the laser beam LB emitted from the fiber end 22 beyond the output 38 of the module 35. The focusing component 17 is disposed in the head 10 on the optical axis A and focuses the laser beam LB from the collimator 15 to a focal point 19. The focal point 19 is deflected from the optical axis A in relation to the deflection of the fiber end 22.

As shown here, two actuators 32a-b can be used to move the fiber end 22 of the delivery fiber 20. For example, a first actuator 32a can be configured to deflect the fiber end 22 back and forth along a first side axis (i.e., X-axis), and a second actuator 32b can be configured to deflect the fiber end 22 back and forth along a second side axis (i.e., Y-axis) orthogonal to the first axis. As noted, the actuators 32a-b can use drives 34 of a piezoelectric element, a solenoid, an electromagnetic coil, and an electric motor. Additionally, the actuator 32a-b can use one or more bearings/joints 36, such as mechanical bearings, flexure bearings, solid-state joints, or the like.

In other arrangements, opposing pairs of actuators 32a-b can be used to move the fiber end 22 (or block 24) back and forth along the same axis. In this configurations, two pairs of actuators 32a-b can be used, one pair for the X-axis and another pair for the Y-axis. As will be appreciated, these and other configurations can be used.

In the practical application of the present system 30, such as used an industrial environment, a great deal of light energy is produced during laser material processing. Part of this light is being imaged by the laser processing head 10 onto the fiber tip 22 and surrounding, which can lead to local heating of the fiber assembly or problems with the laser. A solution for this problem is to use a mode-stripper 26 as shown in FIG. 3. The mode-stripper 26 removes the light from the cladding of the delivery fiber 20. This released energy can then be absorbed (and actively cooled) by the absorber 36 in the module 35 around the fiber end 22.

As shown in FIG. 3, the actuators 32a-b can be spatially separate from the mode-stripper 26. A fixture (not shown) for the delivery fiber 20 can be used in between the actuators 32a-b and the mode-stripper 26. The fixture can be arranged to prevent process light (or reflected laser light) from coupling-out at this fixture.

During operations, laser light from the laser source (6: FIG. 1A) is propagated in the fiber cable and fiber-optic systems over necessary distances, and the laser beam is transmitted into air from the fiber end 22 of the delivery fiber 20. As noted previously, the delivery fiber 20 can use one or more optical fibers, and various types of optical fibers can be used for the delivery fiber 20. As is typical, an optical fiber for the delivery fiber 20 has a core and cladding with slightly different refractive indices based on the material of their construction. Both the fiber core and cladding guides the components known as modes, or guided transversal modes, of the laser light through the optical fiber. Accordingly, the delivery fiber 20 can use an optical fiber that preserves propagation of a single-mode (SM) laser beam (referred to as a single-mode fiber). The single-mode fiber can be made to also maintain, substantially unchanged, the polarization state of the propagating in fiber light. Such an optical fiber is referred to as polarization maintaining (PM) single-mode fiber. By contrast, the delivery fiber 20 can use a multimode optical fiber, which is also known as large mode area (LMA) fiber, having a larger fiber core. The multimode fiber allows for much easier launching of light inside the fiber and can guide the laser beam with significantly higher power compared with the SM fiber. In addition to step index fibers (with a sudden change in the refractive indices between core and cladding), the delivery fiber 20 can use fibers for multi or single mode beam shaping. Examples are gradient index fibers for shaping Gaussian profiles, fibers with several claddings for shaping of ring modes, and also other fibers used according to the state of the art for the transmission of laser light.

In the current arrangement, the beam deflection system 30 preferably uses a single multimode for the delivery fiber 20 with a fused silica fiber endcap for the quartz block 24 spliced to the fiber end 22 by melding the pieces of glass together. This arrangement enables the delivery fiber 20 to handle multi-kW power. Normal cutting or welding laser sources can be used with the multimode delivery fiber 20, with and without beam shaping capabilities. As expected, the quartz-block 24 increases the weight of the moving parts, which means that more powerful actuators 32a-b are required and more space in the head 10 is needed. The system 30 can also be used with high-performance lasers in the single mode or few mode ranges because these can also use a protective endcap on the fiber end 22. Because only a single fiber 20 is used, the actuators 32a-b can be situated radially outward, reducing the volume conflict between them and the stripped-away light from the mode-stripper 26. Potentially, the mode-stripper 26 can be combined with the moving part of the fiber 20, resulting in a shorter overall length.

The beam deflection system 30 can use materials for vibration damping and can be based on the required mechanical and especially damping properties. Among others, the material can be foams made out of polyurethane (PU), silicone, polyethylene (PE) or polyvinyl chloride (PVC).

For protection, the system 30 uses the sealed module or housing 35. The delivery fiber 20 passes through the sealed passage 24 of the sealed housing 35, and the fiber end 22 is coupled to the two or more actuators 32a-b of the system 30. A portion of the delivery fiber 20 inside the housing is stripped with the mode stripping 26, which allows stripped modes of light to escape the fiber 20. The cooled absorber 36 disposed in the cavity 35 of the sealed housing 35 can absorb the stripped light.

A control system or controller 50 receives target movement parameters 52 as input and sends modulated movement signals to the actuators 32a-b. This moves (shifts) the fiber end 22, which will alter the focal point 19 of the laser beam LB. Various arrangements can be used for monitoring the movement of the fiber end 22 and the associated deflection of the focal point 19 to facilitate control and accuracy.

For example, the control system 50 can be configured to monitor movement of the actuators 32a-b as an indication of the deflection of the fiber end 22 (and by extension the deflection of the focal point 19). This monitoring can be provided by feedback sensing 40 from the actuator 32a-b to the control system 50. In another example, the mechanical movement of the fiber end 22 can be monitored directly using a sensor element 42 (proximity sensor, optical sensor, etc.) associated with the fiber end 22. The sensor element 42 sends information to the control system 50, and the control system 50 can monitor the deflection of the fiber end 22 (and by extension the focal point 19) in response to the detection by the sensor element 42. Moreover, appropriate sensor elements 44 or camera-based position detection 46 can be used to determine the deflection of the laser beam in the collimated or divergent area to indicate the deflection of the fiber end 22 and/or the focal point 19. The processing head 10 can use one or more of these monitoring and control arrangements alone or together.

As one example, a sensing arrangement is shown in FIG. 3 that uses a partially reflective mirror 45 and a sensor element 44 to monitor the movement associated with the fiber tip 22 and resulting change in the focal point 19. Portion of the laser beam from the collimator 15 is reflected by the reflective mirror 45 to the sensor element 44, which measures the position of the beam. The current movement parameters determined by the measured position of the beam is then fed back to the control system 50 so that the target movement parameters can be achieved. This feedback arrangement can monitor and control the movement of the fiber end 22 by the actuators 32a-b to achieve the target movement of the beam's focal point 19. The other sensing arrangements (e.g., actuator feedback sensor 40, direct sensor 42 detecting movement of the fiber end or quartz block 24, camera-based position detection 46, etc.) can operate in a comparable manner.

Figure 4:
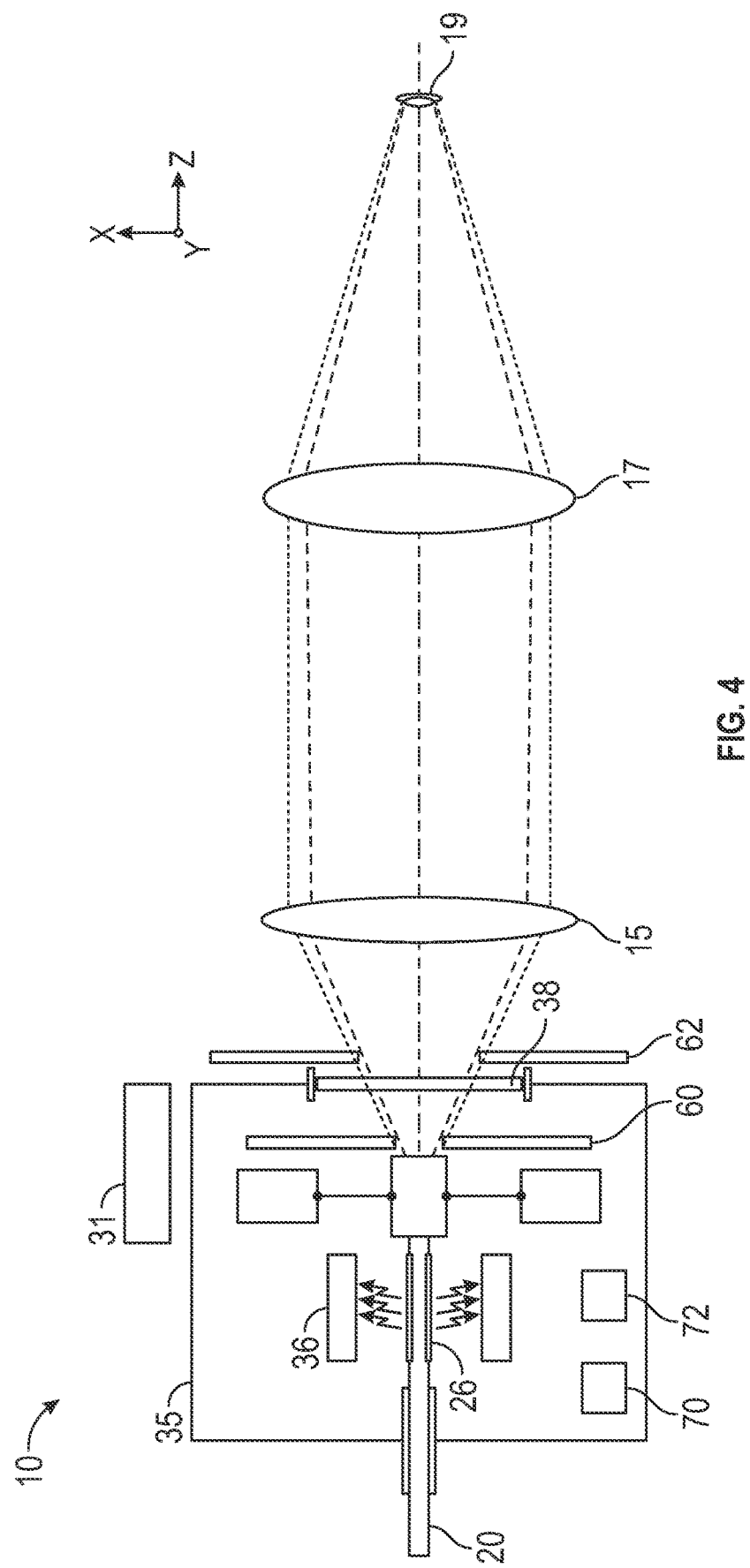
FIG. 4 schematically illustrates additional cooling and sealing features of the laser processing head of the present disclosure.

Because the laser process is high energy, the system 30 needs to be protected from back reflections and process light. For example, FIG. 4 schematically illustrates additional cooling features of the laser processing head 10 of the present disclosure for protecting the system 30. As noted herein, the beam deflection system 30 can be used for high-power laser material processing, including welding, brazing, cutting, etc. The laser source (6: FIG. 1A) can be a multi-kilowatt laser system, a solid state laser, or single mode to multimode fiber laser. Therefore, the beam deflection system 30 is intended to be used in an industrial environment, which has harsh conditions (vibration, shock, dirt, liquids, fumes, dust etc.). Accordingly, the system 30 includes the sealed housing 35 for a robust and sealed design. The sealed protective window 38 encloses the opto-mechanics, and the mode stripper 26 is used with the (water) cooled absorber 36 to remove the unwanted backscatter. Still, there is a high thermal load to the system 30 due to high-duty cycle, e.g., long laser "ON" times, in which more energy goes through the system 30 and produces a constant high load. Accordingly, a cooling arrangement 31, such as water cooling, can be used to cool the module 35 and can also cool the complete head 10 or additional elements of the head 10.

In this operating environment, the system 30 is configured to handle back reflections and process light from the process region. Additional features can also be used to protect the opto-mechanics against overheating. For example, a cooled aperture 60 can be disposed inside the sealed module 35 to protect the fiber end 22 and actuators 32*a-b* from back reflection and process light. Additionally or in the alternative, a cooled aperture 62 outside the window 38 of the sealed module 35 can be provided. These apertures 60, 62 can also protect the optical system 10 from laser radiation from the fiber 22 that is above a permissible divergence.

Additional monitoring systems can be used. A light sensitive device 70 in the module 35 can detect a fiber break. Such a device 70 could also detect process light or back scatter entering the module 35 from the process area at the focal point 19 of the laser beam. This sensor can also be used for diagnosis and process control. Temperature monitoring 72 in the module 35 can uses temperature switch or thermo resistor to monitor temperatures above set thresholds. Plug monitoring at the receiver (14: FIG. 1B) of the head 10 can be used to open a laser safety circuit should the cable (16) be disconnected. In addition, the targeted opening of the laser safety circuit can be used to switch off the laser based on the monitoring functions of the head 10 or the module 35 in the event of a fault.

Figure 5:
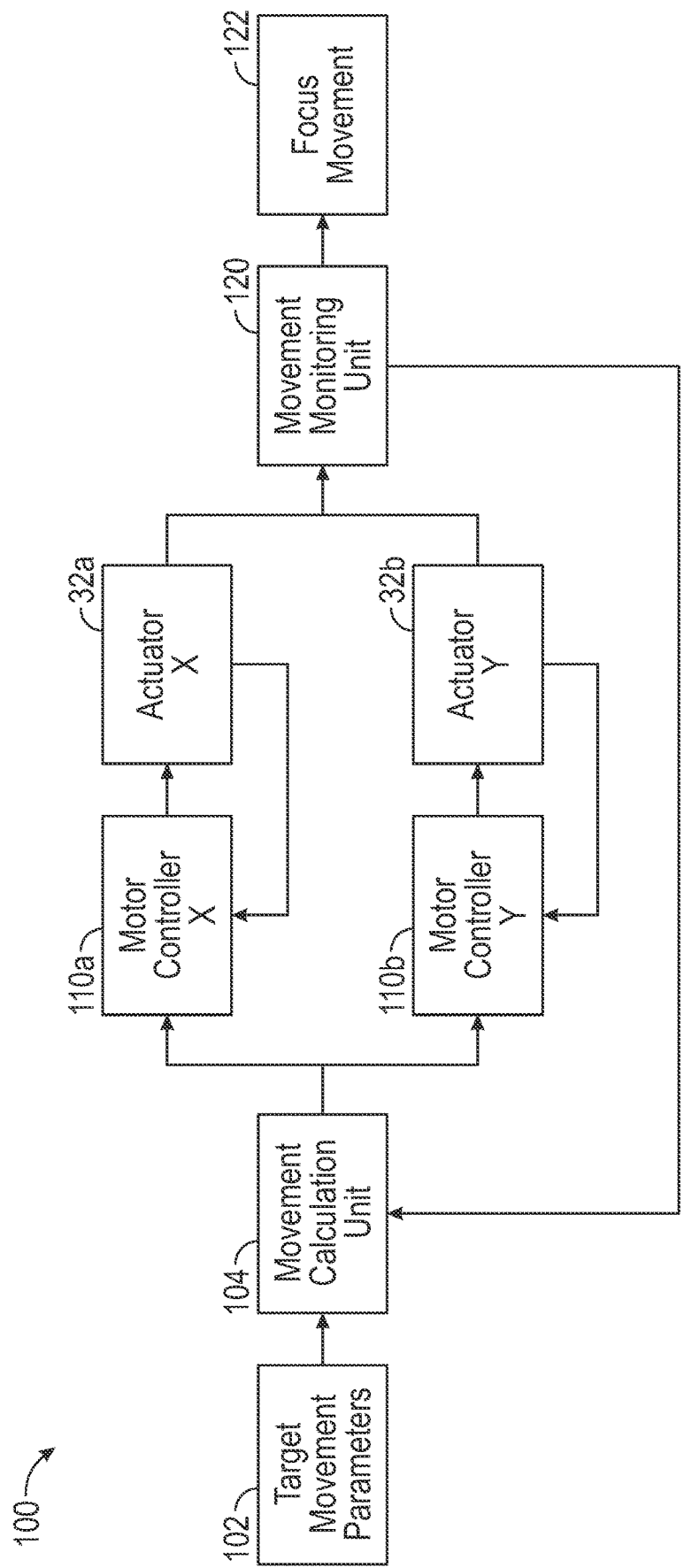
FIG. 5 diagrams a control system for the laser processing head of the present disclosure.

FIG. 5 illustrates a schematic of a control system or controller 100 for the beam deflection system (30) in the laser processing head (10) of the present disclosure. (Components depicted here can be part of or integrated into the control system or controller 50 discussed previously. Features of the control systems and controllers disclosed here can use processing equipment, memory, and communication interfaces commonly used for laser processing heads so that the details are not reiterated here.) Target movement parameters 102 are input into a movement calculating unit 104, which calculates the movement to be applied by the actuators 32*a-b* to the fiber end (22). As noted, at least two actuators 32*a-b* can be used to achieve the movement of the fiber end (22) in an X-Y plane so that the current architecture includes two motor or drive controllers 110*a-b* and actuators 32*a-b*, one of each X and Y axes. The movement control unit 104 feeds the calculated movements to the respective motor controller 110*a-b*, which then operates the respective actuator 32*a-b* to move the fiber end (22). The movement monitoring unit 120 then uses the reflective mirror (40), the sensing element (42), and the controller (50) to monitor the movement of the laser beam. Feedback from the movement monitoring unit 120 to the movement calculation unit 104 can provide the incremental adjustments. In the end, the focal point of the laser beam is moved as desired to meet the target positioning.

Inputs for the control system 100 include frequency, amplitude, shape/pattern and orientation/rotation (e.g., motion vector). Based on the inputs, the control system 100 calculates and executes the movement requirements for both axes. The control system 100 monitors the movement/deflection in the X- and Y-axis, e.g. frequency, waveform and amplitude plus synchronization and phase shift. The monitoring can be direct by monitoring the moving parts, e.g., fiber tip/block, joints, etc. Also, the control system's monitoring can be indirect by monitoring the deflection of the laser beam using the mirror (40) and sensing element (42) to detect the laser position.

The teachings of the present disclosure is believed to provide a number of improvements over existing techniques and systems. In particular, the present disclosure provides a sealed module in a laser processing head to provide a high power laser from a single laser source that is above 1 kW and can be used for a variety of laser processes, including cutting, welding, additive manufacture, and the like. The laser processing head can use a number of different fiber types for the delivery fiber and uses a quartz block on the fiber tip. The laser processing head uses robust actuators (e.g., solenoid, electromagnetic coil, electric motor, etc.) in addition to piezoelectric elements and uses robust mechanics (e.g., mechanical bearings, flexure bearings, or solid-state joints, etc.) to move the fiber tip and quartz block. During operation, the features of the disclosed laser processing head allow for monitoring the fiber, the fiber movement, and/or the laser process, and features of the disclosed head provide protection against scattered light and back reflection. Even with all of these improvements, the disclosed laser processing head offers dynamic beam-shaping in x and y directions to generate complex geometries, such as even Lissajous figures, with only one output module and laser source, while still giving a magnification factor smaller than 10 and having a scanning amplitude of the focal spot smaller than 10 mm.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A laser processing head for lasing a workpiece, the head comprising:
   a sealed housing, disposed in the head, having an input and an output;
   a delivery fiber, disposed in the input of the sealed housing, configured to emit a laser beam along an optical axis from a fiber end toward the output of the sealed housing;
   at least one actuator, disposed in the sealed housing and engaged with the fiber end, configured to laterally displace the fiber end along at least one side axis perpendicular to the optical axis;
   a collimator, disposed in the head on the optical axis, configured to collimate the laterally displaced laser beam emitted from the fiber end;
   a focusing component, disposed in the head along the optical axis, configured to focus the collimated laser beam from the collimator to a focal point at the workpiece, the focal point being deflected from the optical axis in relation to the deflection of the fiber end;

at least one cooled aperture disposed relative to the sealed housing and the collimator and being configured to prevent back reflection of at least some laser light toward the sealed housing; and a controller configured to:
receive target movement parameters;
receive an indication of the deflection of the focal point from at least one of:
an actuator feedback sensor that outputs an indication of movement applied by the at least one actuator;
a sensor element that that outputs an indication of the displacement of the fiber end; or
a sensor element or camera-based position detector that captures an indication of deflection of the laser beam; and
output modulated movement signals to the at least one actuator in accordance with the target movement parameters and the received indication of the deflection of the focal point.

2. The head of claim 1, wherein the fiber end comprises a quartz block spliced to a fiber tip of the delivery fiber.

3. The head of claim 1, wherein an output side of the quartz block comprises an antireflective coating, a spherical surface, or an aspherical surface.

4. The head of claim 1, wherein:
the delivery fiber is configured to emit the laser beam at a power of greater than 1 kW; and
the delivery fiber comprises one or more optical fibers selected from the group consisting of a single mode fiber, a multimode fiber, a fiber having a step index, a fiber having a gradient index, and a fiber having multiple types of cladding or cores.

5. The head of claim 1, wherein:
the delivery fiber comprises a mode stripper disposed in the sealed housing; and
the sealed housing comprises a cooled absorber disposed in the sealed housing about the mode stripper.

6. The head of claim 1, wherein:
the input comprises a passage of the sealed housing sealed with the optical fiber; and
the output comprises a protective window of the sealed housing.

7. The head of claim 1, wherein:
the at least one side axis comprises a first axis and a second axis; and
the at least one actuator comprises:
a first actuator configured to deflect the fiber end along the first axis and a second actuator configured to deflect the fiber end along the second axis;
a drive selected from the group consisting of a piezoelectric element, a solenoid, an electromagnetic coil, and an electric motor; and
one or more mechanical bearings, flexure bearings, or solid-state joints.

8. The head of claim 1, further comprising:
an infrared sensitive device disposed in the sealed housing and configured to detect a break in the delivery fiber;
a light sensitive device disposed in the sealed housing and configured to detect process light or back scatter from a process area; or
a temperature sensor disposed in the sealed housing and configured to monitor temperature relative to a threshold.

9. The head of claim 1, wherein the signal output by the sensor element is indicative of the deflection of the focal point.

10. The head of claim 1, wherein the at least one cooled aperture comprises:
a cooled aperture disposed in the sealed housing between the fiber end and the output; and
a second cooled aperture disposed in the head between the output and the collimator.

11. A module for a laser processing head configured to lase a workpiece by providing a laser beam via a collimator and a focusing component, the module comprising:
a sealed housing having an input, an interior, and an output, the output having a window enclosing the interior, the sealed housing configured to integrate into the laser processing head;
a delivery fiber sealed in the input of the sealed housing;
a quartz block spliced to a fiber tip of the delivery fiber, the delivery fiber and the quartz block being configured to emit the laser beam toward the output;
at least one actuator, disposed in the sealed housing and engaged with the fiber end, configured to laterally displace the fiber end along at least one side axis orthogonal to an optical axis through the collimator and the focusing component of the laser processing head; and
a controller configured to:
receive target movement parameters;
receive an indication of the deflection of the focal point from at least one of:
an actuator feedback sensor that outputs an indication of movement applied by the at least one actuator;
a sensor element that that outputs an indication of the displacement of the fiber end; or
a sensor element or camera-based position detector that captures an indication of deflection of the laser beam; and
output modulated movement signals to the at least one actuator in accordance with the target movement parameters and the received indication of the deflection of the focal point.

12. A laser processing method, comprising:
receiving target movement parameters by a controller;
emitting a laser beam by a fiber end of an optical fiber disposed in an input of a sealed housing;
laterally displacing the fiber end, by at least one actuator engaged with the fiber end in the sealed housing, along at least one side axis orthogonal to an optical axis;
collimating the laser beam emitted from the fiber end by a collimator disposed beyond an output of the sealed housing;
receiving, by the controller, an indication of the deflection of the focal point from at least one of:
an actuator feedback sensor that outputs an indication of movement applied by the at least one actuator;
a sensor element that that outputs an indication of the displacement of the fiber end; or
a sensor element or camera-based position detector that captures an indication of deflection of the laser beam;
outputting modulated movement signals, by the controller to the at least one actuator, in accordance with the target movement parameters and the received indication of the deflection of the focal point;
lasing a workpiece by focusing the laser beam from the collimator to a focal point at the workpiece using a focusing component, the focal point being deflected from the optical axis in relation to the deflection of the fiber end; and preventing back reflection of at least some laser light toward the sealed housing by at least one cooled aperture disposed relative to the sealed housing and the collimator.

13. The method of claim 12, wherein preventing back reflection of at least some of the laser light toward the sealed housing comprises:
using a first cooled aperture disposed in the sealed housing between the fiber end and the output; and
using a second cooled aperture disposed in the head between the output and the collimator.

14. The method of claim 12, wherein emitting the laser beam comprises emitting the laser beam from a quartz block spliced to a fiber tip of the optical fiber.

15. The method of claim 12, wherein emitting the laser beam comprises:
stripping modes of the laser beam by a mode stripper disposed in the housing; and
absorbing the stripped modes by a cooled absorber disposed in the housing about the mode stripper.

16. The method of claim 12, the fiber end of the optical fiber disposed in the input of the sealed housing emits the laser beam out of a protective window of the sealed housing.

17. The method of claim 12, wherein the at least one side axis comprises a first axis and a second axis and deflecting the fiber end by actuating the at least one actuator comprises:
deflecting the fiber end along the first side axis by actuating a first actuator and deflecting the fiber end along the second side axis by actuating a second actuator;
operating a drive selected from the group consisting of a piezoelectric element, a solenoid, an electromagnetic coil, and an electric motor; and
transferring the drive to the fiber end with one or more of a mechanical bearing, a flexure bearing, and a solid-state joint.

18. The method of claim 12, further comprising:
detecting a break in the optical fiber using an infrared sensitive device disposed in the sealed housing;
detecting process light or back scatter from a process area using a light sensitive device disposed in the sealed housing; or
monitoring temperature relative to a threshold using a temperature sensor disposed in the sealed housing.

19. The method of claim 12, further comprising:
monitoring movement of the actuator and controlling the deflection based on the monitored movement;
sensing movement of the laser beam and controlling the deflection based on the sensed movement; or
sensing movement of the fiber tip and controlling the deflection based on the sensed movement.

* * * * *